United States Patent [19]

Knestel

[11] Patent Number: 4,750,354
[45] Date of Patent: Jun. 14, 1988

[54] METHOD AND APPARATUS FOR TESTING OF BRAKES ON A BRAKE TEST RIG FOR MOTOR VEHICLES

[76] Inventor: Anton Knestel, Riedleweg 4, D-8961 Hopferbach, Fed. Rep. of Germany

[21] Appl. No.: 10,425

[22] Filed: Feb. 3, 1987

[30] Foreign Application Priority Data

Feb. 5, 1986 [DE] Fed. Rep. of Germany ....... 3603508
Dec. 3, 1986 [DE] Fed. Rep. of Germany ....... 3641339

[51] Int. Cl.$^4$ ............................................... G01L 3/28
[52] U.S. Cl. ...................................................... 73/126
[58] Field of Search .......................... 73/126, 123, 117

[56] References Cited

U.S. PATENT DOCUMENTS 3,952,589 4/1976 Geul .................................. 73/123 X
4,050,299 9/1977 Maxwell ................................ 73/126

Primary Examiner—Jerry W. Myracle
Attorney, Agent, or Firm—Holman & Stern

[57] ABSTRACT

A method is described for testing brakes on brake test stands or rigs for motor vehicles with a plurality of motor-driven axles, wherein the axle of the brake to be tested is not de-couplable. Both wheels of this axle stand on rollers or the like on the rig and, during the test procedure, are driven in opposite directions. During the test the speed of rotation of both wheels is measured and is maintained equal by means of a control operation regulated by the result of the measurement. Apparatus is described which includes devices, such as contact rollers, which measure the speed of rotation but are separate from the devices for driving the wheels. In the event of differences being detected between the measured rotational speed and the rotation speed of the other wheel a controller adjusts the rotational speed of one or both wheels. It is especially favorable if, on the wheels of the axle of the brake to be tested, a mark is secured which co-operates with a path or position recorder. In particular, the mark is advantageously formed as a reflector which directs a light impulse to a sensor.

9 Claims, 2 Drawing Sheets

METHOD AND APPARATUS FOR TESTING OF BRAKES ON A BRAKE TEST RIG FOR MOTOR VEHICLES

BACKGROUND OF THE INVENTION

The invention relates to a method for testing brakes on brake test rigs for motor vehicles with a plurality of motor-driven axles.

The invention further relates to apparatus for carrrying out a method of the aforementioned kind.

Known brake testing stands are intended to test the brakes of a motor vehicle as to their function. In fact, in order to be able to establish deficiencies and to create a basis for remedying these deficiencies it is necessary that the function of the individual brakes themselves should be tested.

To this end, the motor vehicles are placed with the wheel of the brake to be tested on a driven support surface, preferably on a driven pair of rollers. The pair of rollers is driven by a motor and on operation of the brake of the motor vehicle concerned the braking moment can be measured, for example, by measuring the reverse turning moment on the motor driving the pair of rollers.

If the brake of a single undriven wheel is tested, this measuring procedure succeeds without difficulty. Correspondingly, it is also satisfactory when the test is concerned with the brake for a wheel of a driven axle of a private vehicle, if the drive for this axle can be shut off. In the case of an uncoupled vehicle drive, the adjoining axle and, through the differential, the propellor shaft, are driven by the drive for the rollers on which the wheel is resting. The additional moving masses have no effect on the result of the measurement.

If the vehicle has an all-wheel drive, the brake test can be carried out in a similar way to that described above, if it is possible to disconnect the all-wheel drive, that is, for example, to uncouple one of the driven axles. Each axle can then be tested individually like an axle of a vehicle with a forward or rear drive.

The same is true when the drive of the axle to be tested cannot be shut off, but a freewheel device is provided and the direction of rotation can be chosen so that the freewheel device is operative.

If, however, the axle to be tested is not drivably separable from the other axle, the brake test results in the propellor shaft being driven through the differential and thus in the other axle also being driven. Even if the other axle rests with its wheels on rollers, impulses are unavoidably transmitted to this other axle. The other axle, which is not under test, is also braked during the braking procedure, so that even a roller arrangement is not a solution to the problem, apart from the expenditure due to the necessary adjustment of the rollers to the spacing of the axles.

Attempts have already been made to make a brake test possible in such cases by driving the wheels in different directions. Testing the brake, however, results in slippage of the wheel resting on the rollers and since the brakes will certainly act differently with different directions of rotation, the propellor shaft will be driven through the differential and thus the measurement will be falsified.

Similar problems to those with private vehicles with all-wheel drive and axles which cannot be uncoupled arise with goods vehicles with several driven axles.

It is also known to locate fluid drives between the axles of all-wheel drive goods vehicles, which allow only small differences in the speed of rotation of the driven axles. In a brake test, however, such fluid couplings act like rigid couplings, so that the problem also arises in the case of vehicles with this kind of construction.

When the wheel of the brake to be tested is referred to in the preceding or following text, reference to a double wheel is also to be understood where appropriate.

BRIEF SUMMARY OF THE INVENTION

The object of the invention is to improve a method of testing brakes of the kind described in the introduction in such a way that, for example, even in the case of a goods vehicle with all-wheel drive an unobjectionable test of a single brake of one axle is possible, even though the axle to be tested or the other axle cannot be uncoupled. At the same time the test should be as practical as possible, especially in relation to the forward movement of the wheel concerned. In particular, the method should be so designed that it can be carried out without special preparation.

A further aim of the invention consists in the provision of a device for carrying out the method.

The invention provides a method of testing brakes on brake test rigs for motor vehicles with a plurality of motor-driven axles, wherein the axle of the brake to be tested is not de-couplable wherein both wheels of this axle stand on rollers or the like and during the testing procedure are driven in opposite directions, and wherein during the test, the speed of rotation of both wheels is measured and is maintained equal by means of a control operation regulated by the result of the measurement.

Hitherto it was known only to drive both wheels of an axle in different directions, suitably using motors with the same rotational speed. In the case of an unbraked axle this also results in the same rotational speeds in the opposite direction. When, however, a brake test is applied, slippage results between the rollers driven by the motor on the one hand and the driven wheel of the vehicle on the other hand, which results in the two wheels of an axle not having the same rotational speed any longer. This leads to the faults and difficulties in the brake test which are set out above. If, however, as is proposed according to the invention, the rotational speed of the wheels is measured during the test and is maintained equal, the propellor shaft, which is drivably connected with the two wheels through the differential, will no longer undergo any rotary movement. Thus, no additional forces or moments are introduced into the measuring arrangement by the propellor shaft and it is of no importance whether the propellor shaft is rigidly coupled, or not, with the other axle of an all-wheel drive vehicle, which is not to be tested. In this way it is possible to determine the braking moment of the brake to be tested without interference. The other wheel of the same axle can, if desired, be tested at the same time. But it is to be noted that this wheel is turning in the opposite direction and the measurement of the braking moment in this direction of rotation is not in general desired. By changing the direction of rotation, however, this wheel can also, in a simple manner, be tested with respect to the effectiveness of its brake.

The proposal according to the invention can be realized in various ways. Thus, for example, the wheel of the brake to be tested can be driven faster in order to achieve equal rotational speeds for both wheels of an axle. This faster drive does not lead, however, to a greater rotational speed for this wheel because the wheel only compensates, through the drive, for the slippage by which the wheel lags behind with respect to the drive.

In another variant of the invention, it is provided that the wheel associated with the axle which is not under test, and which is driven in the opposite direction, is driven more slowly in order to achieve equal rotational speeds or also that both wheels of the axle of the brake to be tested are driven with the same, approximately intermediate, rotational speed.

The rotational speed can, for example, be the peripheral speed which is measured by a contact roller on the periphery of the wheel. A different tire pressure or differently worn tires does, however, deleteriously influence the result of the measurement.

It is therefore, further proposed that the angular wheel velocities of both wheels should be measured, compared and used for the control operation.

It has been found that the measurement of the speed of angular rotation of the wheel is comparatively simple to realise and gives very exact results. It is clear that the measurement of the angular rotation of the wheel is completely independent of chance circumstances of the condition of the wheel such as, for example, different states of wear or different air pressures.

The measurement of the angular rotation of the wheel can, for example, be measured by attaching marks to the wheels which rotate and whose period of rotation can be measured.

The measurement of the angular rotation of the wheel can be used in place of the measurement of the rotational velocity at the periphery of the wheel. It is better, however, as the invention further proposes, if the measurement of the angular rotation of the wheel is used in addition to the measurement of the rotational velocity, which establishes the rotational velocity, for example, by means of contact rollers on the periphery of the wheel. A combination or super-position of the results of the two measurements can be brought about without anything further being necessary and very quickly leads to a situation in which it is clear that no turning moment is introduced into the measuring system via the propellor shaft. It has been found that already after a few seconds, if the propellor shaft plays a corresponding roll, the elements which take up from the propellor shaft at the differential, execute to-and-fro oscillatory movements.

This phenomenon shows that no turning moments are introduced via the propellor shaft any longer, or the turning moments introduced lie well below the accuracy of measurement and oscillate about the value zero in each case. In the case of a demounted propellor shaft, the fact that the differential is connected to the propellor shaft does not introduce any additional turning movement.

Apparatus according to the invention for carrying out the method described above is such that both wheels of the axle co-operate with devices for measuring speed of rotation, which are separate from the devices for driving these wheels, and that in the case of differences between the measured rotational speed and the rotational speed of the other wheel a controller adjusts the rotational speed of one or both wheels.

It is especially favorable if on the wheels of the axle of the brake to be tested, a mark is secured which cooperates with a path or position recorder. In particular, the mark is formed as a reflector which directs a light impulse to a sensor. Here an important advantage emerges. It is not necessary, for example, to make a number of marks on the wheel, which have an exact angular spacing from one another. Rather it is sufficient if a single mark is provided and preferably the time of rotation of this mark is measured.

This advantage simplifies the use of the method according to the invention decisively. It does not matter in what position the mark is located on the periphery so that expensive setting up operations, measurements, etc. are not necessary in this connection.

BRIEF DESCRIPTION OF THE DRAWINGS

There will now be described an example of the invention which is represented schematically in the drawings, which show:

In FIG. 1, the vehicle 8 whose brake is to be tested stands with its front axle on the brake testing rig 11. To improve the illustration, the schematically represented parts of the vehicle 8 are drawn in double lines. The drive motor 13 drives the front axle 3 through the gearbox 14', which at the same time includes the differential 14 of the front axle as well. The differential 17 of the rear axle 12 is driven through the propellor shafts 15 and 16, and the wheels of the rear axle stand on the ground during the brake test illustrated. The propellor shafts 15 and 16 are coupled together through a fluid coupling 18, which when the vehicle is driven can even out minor differences in rotational speed between the front axle 3 and the rear axle 12 but which behaves like a rigid coupling in the case of larger differences.

Figure 1:
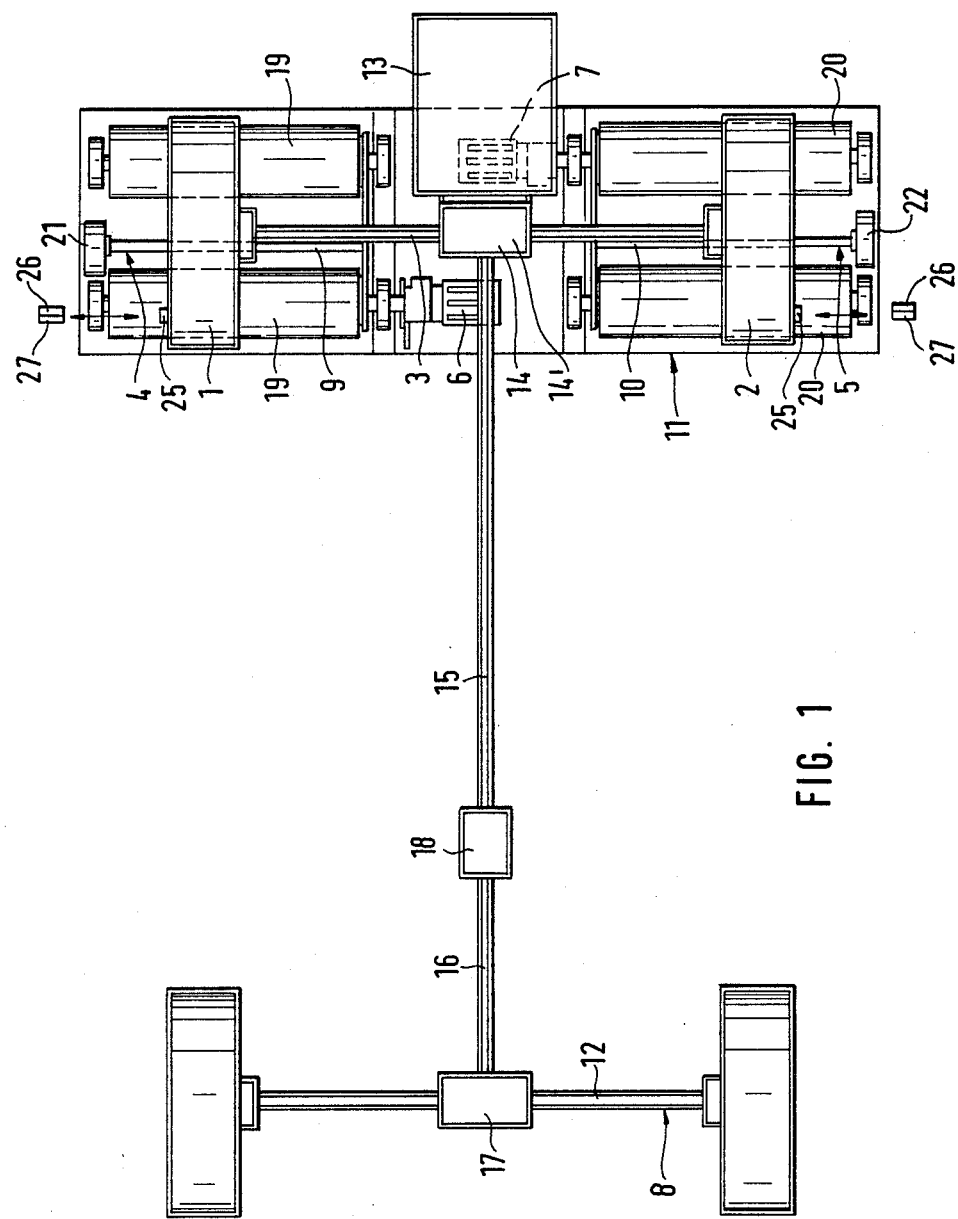
In FIG. 1 a plan of a brake testing rig with a device according to the invention, during a brake test and In FIG. 2 a block diagram of a circuit for carrying out the method of the invention.

The left wheel 1 of the front axle 3 stands in the brake test stand on the two rollers 19, the right wheel 2 on the two rollers 20.

The rollers of the pair of rollers 19 and the rollers of the pair of rollers 20 are in each case drivably interconnected. The pair of rollers 19 is driven by the drive motor 6 and the pair of rollers 20 is driven by the drive motor 7. Testing of the braking force is achieved by measuring the reverse turning moment which occurs at the motor 6 or the motor 7 on application of the brake. A device of that kind is described, for example, in West German patent specification No. 2733 639.

Other arrangements can be provided in place of the pairs of rollers 19 and 20, for example, moving belts. In general, however, pairs of rollers are preferred.

Between the rollers 19 and the rollers 20 respectively is located a contact roller 9 or 10. The height of the contact rollers 9 and 10 is determined by springs, so that these contact rollers 9 and 10 engage the periphery of the wheels 1 and 2. The contact rollers 9 and 10 drive tachogenerators 21 and 22 respectively so that in this way, devices 4 and 5 for measurement of speed of rotation are produced, which measure the peripheral speed of the wheels 1 and 2. It is to be noted here that the directions in which the wheels 1 and 2 are driven are opposed to one another to ensure that the differential 14 exerts no turning moment on the propellor shaft 15.

On each of the two wheels 1 and 2 of the vehicle 8 to be tested, marks in the form of reflectors 25 are secured.

Such reflectors can, for example, be stuck on the cover of the associated tire after the surface has been cleaned. The reflectors comprise, in known manner, mirror surfaces arranged in the form of a honeycomb, wherein three mirror surfaces always combine to form a pyramid. The angles between the surfaces of the individual mirrors are 90° with the result that a ray of light from the light source 27 which falls on such a reflector is reflected back in the direction of the light source 27 to the sensor 26.

The arrangement of the reflectors 25 on the wheels 1 and 2 can be effected at any desired position without critically affecting the measuring procedure. It is, however, advantageous if the arrangement is chosen to be the same on the wheel 1 and the wheel 2 with respect to the sensor 26 and the light source 27. In this way the lapse of time to full adjustment is shortened.

Figure 2:
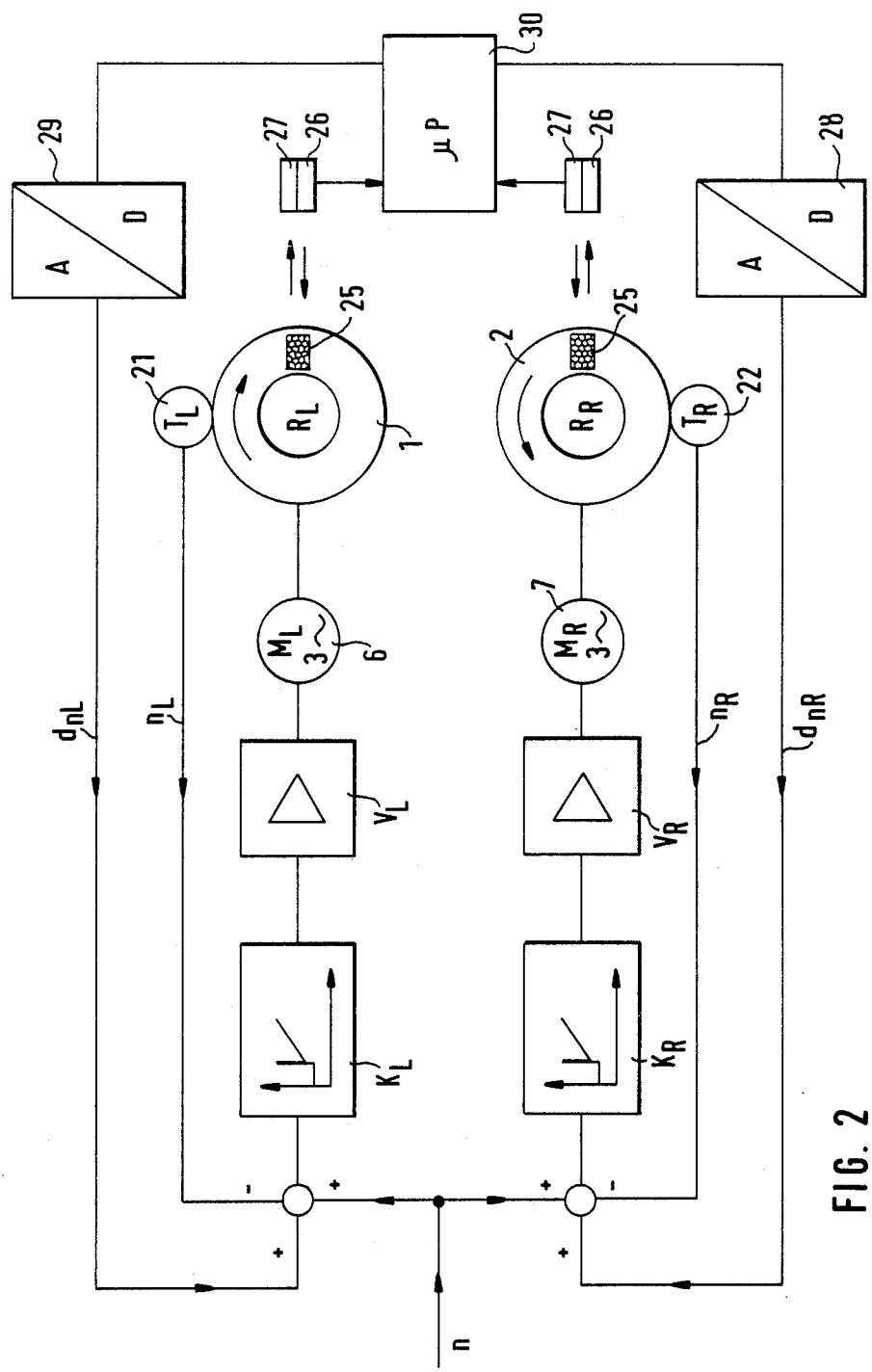

FIG. 2 shows the block diagram of the circuit for the method according to the invention. The indices R and L, which have been introduced, denote in each case the right or left wheel. The desired value generator for the rotational speed is indicated by N, the controllers by $K_L$ or $K_R$, the adjustment members by $V_L$ and $V_R$ and the roller drive motors by $M_L$ and $M_R$. The two wheels $R_L$ and $R_R$ are driven in opposite directions and the contact roller tachometers or tachogenerators are designated by $T_L$ and $T_R$.

The contact roller tachometers $T_L$ and $T_R$, which correspond to the tachogenerators 21 and 22 in the representation of FIG. 1 measure the peripheral speed of the wheel N in each case and feed them to the appropriate controllers.

The starting procedure of the device according to the invention is effectively determined by these measured values and the desired values. If both wheels are adjusted to approximately the same speed the control of the angular rotation of the wheels is thereafter effective. In the embodiment illustrated, the reflectors 25 serve as marks on the wheels 1 and 2 which reflect the beam of light from the source 27 to the sensor 26 in each case, that is to the measured value recorders. Instead of this optically effective arrangement, however, electrical, mechanical or electromechanical path or position recorders can also be used. It has been found, however, that the optically designed arrangement gives a trouble-free operation with simple means.

The invention envisages in particular that the light source 27 sends out light impulses so that by means of suitable known devices the time or rather the number of impulses is established which transpires until the reflector has undergone a complete revolution. The microprocessor 30 processes the signals and compares the two time periods or numbers of impulses with one another, and produces digital values, which after digital-analogue conversion in the convertors 28 and 29 to respective control values dn of the two control circuits are combined in such a way that the rotational or phase angle differences are adjusted to zero as quickly as possible.

It is clear that in the most unfavorable case the two reflectors 25 are turned with respect to one another through 180°. The control procedure, however, causes this phase angle difference to disappear. When no phase angle difference exists any more, the time periods or numbers of impulses for a complete revolution of the reflectors are in complete agreement. When this condition has been reached, which, for example, is indicated optically or acoustically by an electronically generated signal, the brake trial can be carried out. It has been found that even in the most unfavourable case for less than half a minute elapses until the phase angle difference is zero.

During the braking procedure, which is carried out in the usual way, the control is maintained. It is clear that a phase angle difference can arise again during the braking procedure but is immediately eliminated again by the control arrangements. Tests have shown that no differences in measurement can be established if, by way of comparison, brake trials are undertaken with an uncoupled propellor shaft. This shows that in the manner described, the result is that the function of the propellor shaft is eliminated during the brake trial to such an extent that no turning moment at all is imparted to the axle to be tested by the propellor shaft.

In the same test procedure with wheels driven in opposite directions only one wheel can be tested with respect to its brake in the normal direction of rotation. To test the brake of the other wheel of an axle, the directions of rotation have to be reversed.

I claim:

1. A method of testing individual brakes of a motor vehicle having a plurality of jointly driven axles which cannot be uncoupled from each other, and a differential in each driven axle, the method comprising supporting respective wheels at opposite ends of one of said axles on respective first and second pairs of rollers, one of said wheels having a brake to be tested, driving the wheels separately and in opposite directions, measuring the speeds of rotation of the wheels and comparing the respective speeds of rotation, continuously compensating for differences between the two speeds of rotation, so that both wheels rotate at the same oppositely directed speed of rotation, jointly operating the brakes for both wheels, and measuring driving power of the wheel having the brake to be tested during operation of the brakes.

2. A method according to claim 1, wherein the peripheral velocity of the wheels is measured.

3. A method according to claim 1, wherein the angular speeds of rotation of both wheels are measured, compared and used in the control operation.

4. A method according to claim 3, wherein the angular speeds of rotation of both wheels are measured and compared, rotating marks are attached to the wheels, and the period of rotation of the marks is measured.

5. A method according to claim 1, wherein angular rotation measurement on the wheel is used in addition to measurement of the peripheral speed which establishes the speed of rotation on the periphery of the wheel.

6. A brake test rig for motor vehicles having a plurality of jointly driven axles and a differential in each axle, said brake test rig comprising a first pair of support rollers for a wheel at one end of one of said axles, said wheel having a brake to be tested, a second pair of support rollers for a wheel at the other end of said one of the axles, separate controllable drive mechanisms for the respective pairs of support rollers, a power measuring means for the drive mechanism of the first pair of support rollers, measuring devices for measuring the speed of rotation of the respective wheels, and a controller for adjusting the rotation of the respective wheels as required by controlling the respective drive mechanisms to maintain the speeds of rotation of the respectie wheels substantially constant during a testing operation.

7. Apparatus according to claim 6 including contact rollers at a location adjacent the periphery of the wheels for measuring the peripheral speed of the wheels.

8. Apparatus according to claim 6 including a recorder for path or portion cooperating with a mark secured to the wheels of the axle of the brake to be tested.

9. Apparatus according to claim 8 wherein said mark is a reflector, there being further provided a sensor to which a light impulse from said reflector is directed in use.

* * * * *